(No Model.)
J. A. HARRIS.
CULTIVATOR ATTACHMENT.
No. 416,727. Patented Dec. 10, 1889.
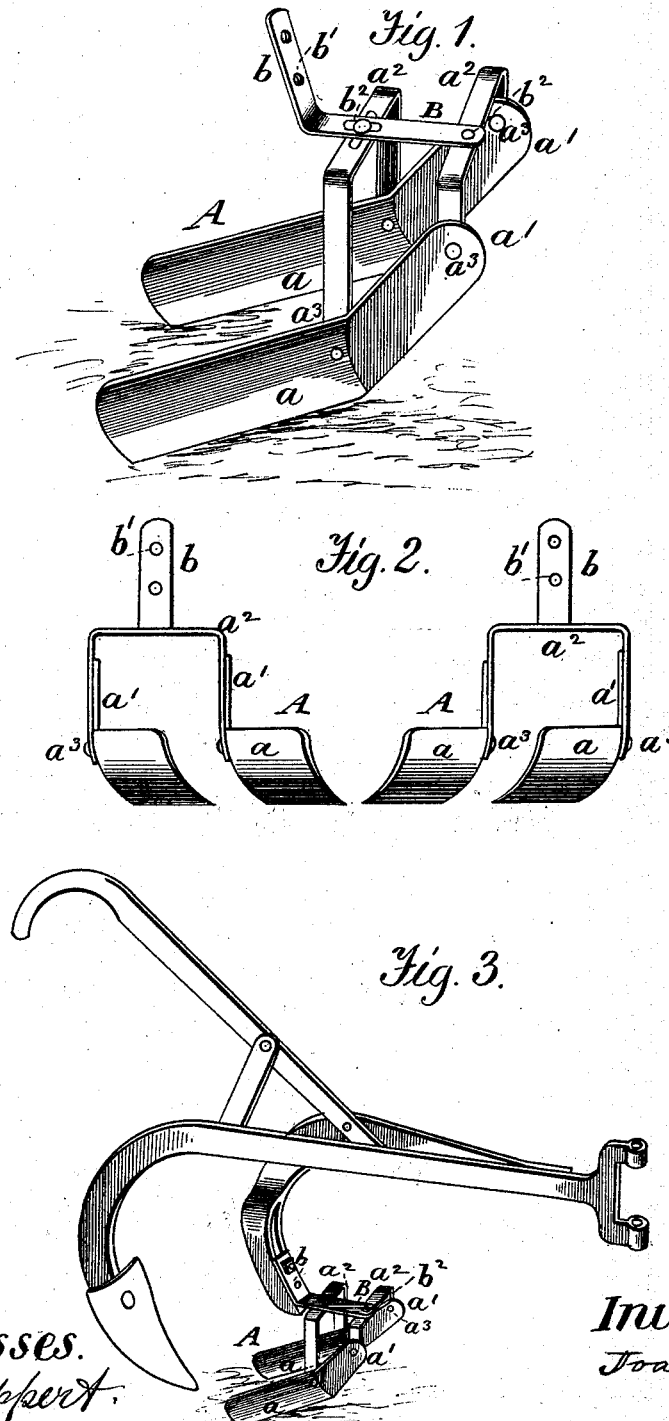
Witnesses.
A. Ruppert.
H. A. Daniels.
Inventor.
Joas A. Harris
Per
Thomas P. Simpson
Atty

UNITED STATES PATENT OFFICE.

JOAS A. HARRIS, OF O'NEILL, NEBRASKA.

CULTIVATOR ATTACHMENT.

SPECIFICATION forming part of Letters Patent No. 416,727, dated December 10, 1889.

Application filed September 2, 1889. Serial No. 322,746. (No model.)

*To all whom it may concern:*

Be it known that I, JOAS A. HARRIS, a citizen of the United States, residing at O'Neill, in the county of Holt and State of Nebraska, have invented certain new and useful Improvements in Cultivator Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to straddle-row cultivators; and it consists in making knives of a peculiar shape, and combining four inclined laterally to the right and four to the left; also, in so connecting each pair that they may be attached to a cultivator-standard by a single bolt.

Figure 1 of the drawings is an elevation in perspective of a pair of the knives with their means of attachment; Fig. 2, a rear elevation showing the oppositely-inclined knives in their local relation to each other, and Fig. 3 a view in perspective of the knives applied to a cultivator stock or frame.

In the drawings, A represents a pair of knives $a$ $a$, bent upward at $a'$, and connected by the arches $a^2$ $a^2$. These knives are fastened at $a^3$ $a^3$ to the arches, and the latter are connected by a bar B, which is bent up to form the part $b$, which is bolted to the cultivator-standard preferably by a single bolt. The knives $a$ are about one foot long, a quarter of an inch thick, about two and one-quarter inches wide, and set about five and one-quarter inches apart. The bar B has holes $b'$, by which it may be bolted to the plow-standard, and holes $b^2$, by which it may be bolted to the arches.

My knife-cultivator straddles a row of plants, breaks up the soil, cuts up all the weeds, and throws fine dirt around the stems of the plants, thus causing the latter to be clean of weeds, have pulverized soil for their roots to penetrate, and to be provided with a full supply of air and moisture.

Having thus described all that is necessary to a full understanding of my invention, what I claim as new, and desire to protect by Letters Patent, is—

1. A detachable harrow-blade for use on drag-bars instead of shovels, consisting of an obtuse-angled plate with the ground part $a$ concaved on the inside, and the flat part $a'$ turned upwardly as well as outwardly from the part $a$, as shown and described.

2. The combination, with harrow-blades constructed as described, of the transverse arches end-fastened to the blades, and the longitudinal angle-plate connecting said arches and adjustable thereon, as shown and described.

In testimony whereof I affix my signature in presence of two witnesses.

JOAS A. HARRIS.

Witnesses:
H. W. McCLURE,
GEO. BLINCO.